United States Patent [19]

Pankow

[11] Patent Number: 4,573,549

[45] Date of Patent: Mar. 4, 1986

[54] PORTABLE GOLF CAR

[76] Inventor: Arnold A. Pankow, 1201 Westmore, Wahpeton, N. Dak. 58075

[21] Appl. No.: 529,974

[22] Filed: Sep. 7, 1983

[51] Int. Cl.⁴ .............................................. B62D 61/06
[52] U.S. Cl. ............................... 180/216; 280/DIG. 5
[58] Field of Search ............... 180/208, 210, 215, 216; 280/DIG. 5

[56] References Cited

U.S. PATENT DOCUMENTS

| | | | |
|---|---|---|---|
| 2,771,145 | 11/1956 | Peters | 180/208 |
| 2,903,082 | 9/1959 | Marcus | 280/DIG. 5 |
| 3,369,629 | 2/1968 | Weiss | 180/216 |
| 3,648,795 | 3/1972 | Moulton | 280/DIG. 5 |

FOREIGN PATENT DOCUMENTS 859577  1/1961  United Kingdom ................ 180/208

Primary Examiner—Joseph F. Peters, Jr.
Assistant Examiner—Ross Weaver
Attorney, Agent, or Firm—Williamson, Bains, Moore & Hansen

[57] ABSTRACT

A golf car apparatus (10) is disclosed. The golf car apparatus (10) includes a frame (12) supported off the surface of the ground by at least three wheels (14, 18), two of the wheels (14) being positioned near the back end of the frame (12) and being interconnected by an axle (16). DC batteries (22) interconnected to an electrical motor (24) are utilized to power golf car apparatus (10). A drive mechanism is interconnected to the electrical motor (24) and a differential mechanism (32) positioned near the center of the axle (16) interconnecting the two rear wheels (14). Foot support means is defined by said frame (12) on either side of said differential mechanism (32) and extend under the axle (16) for positioning of a user's feet such that when the user is standing on the golf car apparatus (10) the user's feet extend at least partially under the axle (16) so as to provide the golf car apparatus (10) with a low center of gravity and a center of gravity distributed between the front and rear wheels (18, 14).

24 Claims, 7 Drawing Figures

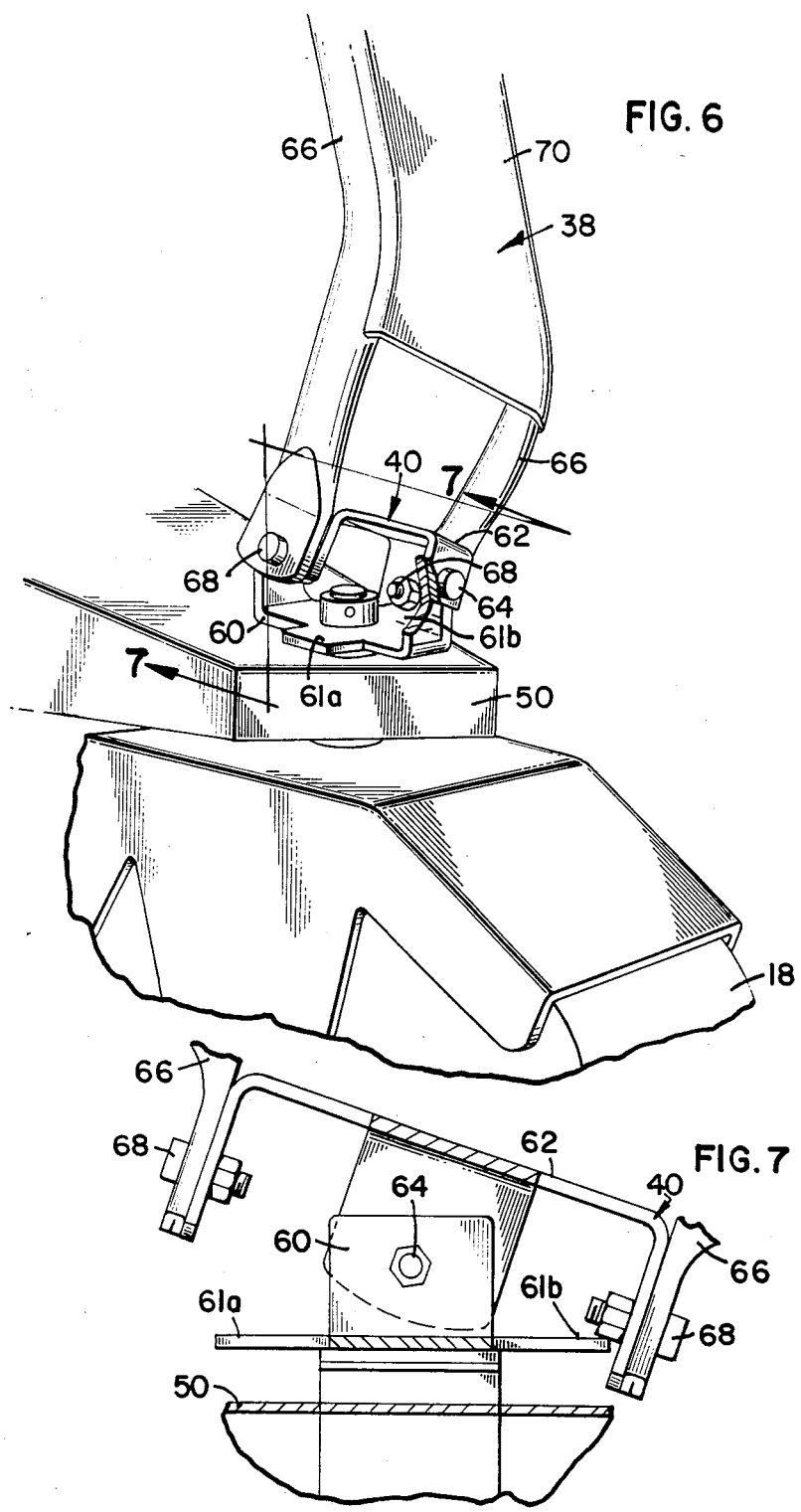

PORTABLE GOLF CAR

BACKGOUND OF THE INVENTION

The present invention relates to a portable, self propelled vehicle and more particularly, to a highly maneuverable, relatively inexpensive golf car which may be readily folded down into a transport configuration for hauling in the trunk of a vehicle or the like.

Golf cars are very common, particularly in view of the popularity of the sport of golf. Typically golf cars are rented by a country club to its clientele. However, many smaller golf courses such as municipal courses do not have any golf cars or do not have an adequate supply of golf cars. Even the large country clubs will run short of golf cars during peak demand periods.

Additionally, for the frequent golfer, the continuous renting of golf cars can be a rather expensive proposition. Furthermore, no two golf cars are alike in their handling and therefore it often takes a period of time to learn the handling characteristics of any given golf car. Also, many of the golf cars are rather bulky being designed for two or more passengers and as a result are not that maneuverable.

For these and other reasons, many golfers would prefer to own their own golf cars. However, currently available golf cars are expensive to purchase. Furthermore once purchased there are expensive maintenance and operational costs over the lifetime of the golf car. Even if one wanted to reduce maintenance and operational costs by self servicing the vehicle, this is difficult on most golf cars. Additionally, the golf cars currently available are not portable requiring that they be left at a particular golf course or carried on a special trailer. Due to the expensive nature of golf cars and a general lack of portability many golfers cannot justify the cost and hassle of owning their own golf car.

Conventional golf cars often exhibit less than desirable stability and handling, poor steering characteristics, and uneven acceleration/deceleration. Furthermore, many golf cars utilize DC battery power systems which require frequent charging further increasing the operating and maintenance costs.

Additionally, conventional golf cars carry their passengers in a seated position. Due to their rather cramped space, mounting and dismounting is a chore. The handicapped, arthritic, etc. find these devices almost impossible to use.

Also, currently available golf cars are not designed specifically for use by a single person making them bulkier, less maneuverable and more expensive than necessary.

Additionally, compaction and turf damage due to the excessive weight of golf cars is a problem for high use golf courses. Many courses for this reason do not allow the use of golf cars on the fairways. Yet others in an attempt to get around this problem have built specially paved trails or roads for the golf cars to travel on. While this solves the compaction and turf damage problem, the purpose of the golf cars is somewhat defeated as a golfer is not able to get close to his golf ball. Furthermore, the building of the trails is very expensive for the golf courses placing further pressures on the cost of golfing. Therefore, a lighter golf car is required which will not create compaction of turf damage.

Many golf cars are banned from golf courses as being unsafe. Golf cars have a high center of gravity such that they are susceptible to being tipped over. Further, the steering of many of the golf cars can jam if turned too sharply. Additionally, the handling characteristics are such that the golf cars can easily get out of control.

The present invention solves these and many other problems associated with currently available golf cars.

SUMMARY OF THE INVENTION

The present invention relates to a golf car including a frame supported off the surface of the ground by at least three wheels, two of the wheels being positioned proximate the side of the frame near the back end and being interconnected by an axle. A DC battery power source supported by the frame provides power to an electrical motor. A drive mechanism interconnected to the electrical motor includes a differential mechanism on the axle interconnecting the rear wheels. The frame further includes foot support means defined on either side of the differential mechanism and extending under the axle for positioning of the driver's feet. The driver's feet extend at least partially under the axle when positioned in the foot support means such that the golf car has a low center of gravity. The golf car further includes a collapsible steering column assembly including handle bars interconnected to a front wheel by a universal (U) joint mechanism including limiting means for limiting the amount the front wheel can be turned to either side. A collapsible support structure supporting the steering column in an upright postion is releasably connected to the steering column assembly to enable the steering column assembly and the support structure to be collapsed onto the frame, whereby the golf car may be loaded into the trunk of a vehicle for transport purposes.

The present invention provides a golf car which is very maneuverable and has a low center of gravity even though the driver operates the vehicle from a standing postion. Furthermore, the center of gravity is longitudinally positioned intermediate of the front end and back ends. Accordingly, the present invention provides a golf car which is very difficult and unlikely to tip either sideways or flip over backwards while providing almost effortless mounting and dismounting of the vehicle.

The present invention is particularly advantageous in that it can be readily configured for transport purposes. In the preferred embodiment, this is accomplished by the removal of a single pin which releases the steering column assembly from its support structure enabling steering column assembly and support structure to be collapsed onto the frame of the golf car thereby minimizing the vertical height requirements. The present invention has an overall width and length which enables the golf car to be carried in the trunk of a vehicle, stationwagon, or the like for transport purposes.

The present invention further provides a golf car which is very safe to operate. In the preferred embodiment of the present invention, the steering column is interconnected to the front wheel of the golf car by a U-joint mechanism which enables the steering column to have universal movement providing for much better control. However the U-joint mechanism includes means for limiting the degree to which the front wheel may be turned right or left thereby reducing the likelihood that the wheel will be turned too sharply so as to cause it to lock and skid.

Additionally, in the preferred embodiment of the present invention, the spindle about which the wheel pivots is angled to be oblique with respect to the vertical plane. Accordingly, when turned to one side or the other the wheel will be tilted such that the leading edge of the wheel does not engage the ground. This allows the wheel to slide and prevents the wheel from locking or jamming if it is turned too sharply.

Furthermore, in the preferred embodiment of the present invention a differential mechanism is utilized on the rear axle. Accordingly if the golf car should tip sideways, the wheel raised above the surface of the ground will be made to spin by the differential mechanism and the other wheel yet in contact with the ground will disengage and remain stationary. This serves to further minimize the likelihood of the golf car tipping.

Additionally, the preferred embodiment includes a platform with a non-skid surface such as rubber extending from the back end of the golf car. The platform is relatively close to the surface of the ground such that even if the golf car should start to tip backwards, the platform will engage the ground and prevent the golf car from tipping over backwards.

Yet another embodiment of the present invention includes a parking brake which can be locked in the on position when the golf car is parked.

The present invention provides a golf car which is very inexpensive to maintain and operate in addition to having a relatively low purchase cost. In the preferred embodiment of the present invention a variable speed control is utilized to vary amperage input into a DC motor which in turn is interconnected with a jack shaft providing a gear reduction so as to eliminate the need for a transmission and provide for a slow and even acceleration/deceleration. Furthermore, the voltage utilized is only that necessary to achieve the desired speed, thereby providing the batteries with a longer life as opposed to other golf cars wherein constant voltage is utilized along with variable amperage.

Also, in the preferred embodiment, a charging receptacle is provided to enable the golf car to be readily plugged into a 110 volt A.C. source for recharging.

Yet another feature of the present invention is its ease of service, the power and drive mechanism being readily accessible and simple to service.

In the preferred embodiment of the present invention, the golf car is adapted for use by a single user and is configured so as to easily fit through and maneuver into areas not accessible by conventional golf cars.

Yet another advantageous feature of the present invention is its relatively light weight thereby increasing its portability and reducing the likelihood of compaction or turf damage.

In the preferred embodiment of the present invention, golf bag brackets are provided on the side of the golf car for carrying one's golf bag. Additionally, the brackets can be utilized to carry an umbrella or other object.

These and various other advantages and features of novelty which characterize the invention are pointed out with particularity in the claims annexed hereto and forming a part hereof. However, for a better understanding of the invention its advantages and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 6 is an enlarged fragmentary perspective view of the U-joint mechanism illustrating the movement limiting feature of the U-joint mechanism; and FIG. 7 is a sectional view generally along line 7—7 in FIG. 6 with the parts in a different position.

DETAILED DESCRIPTION OF A PREFERRED EMBODIMENT

Figure 1:
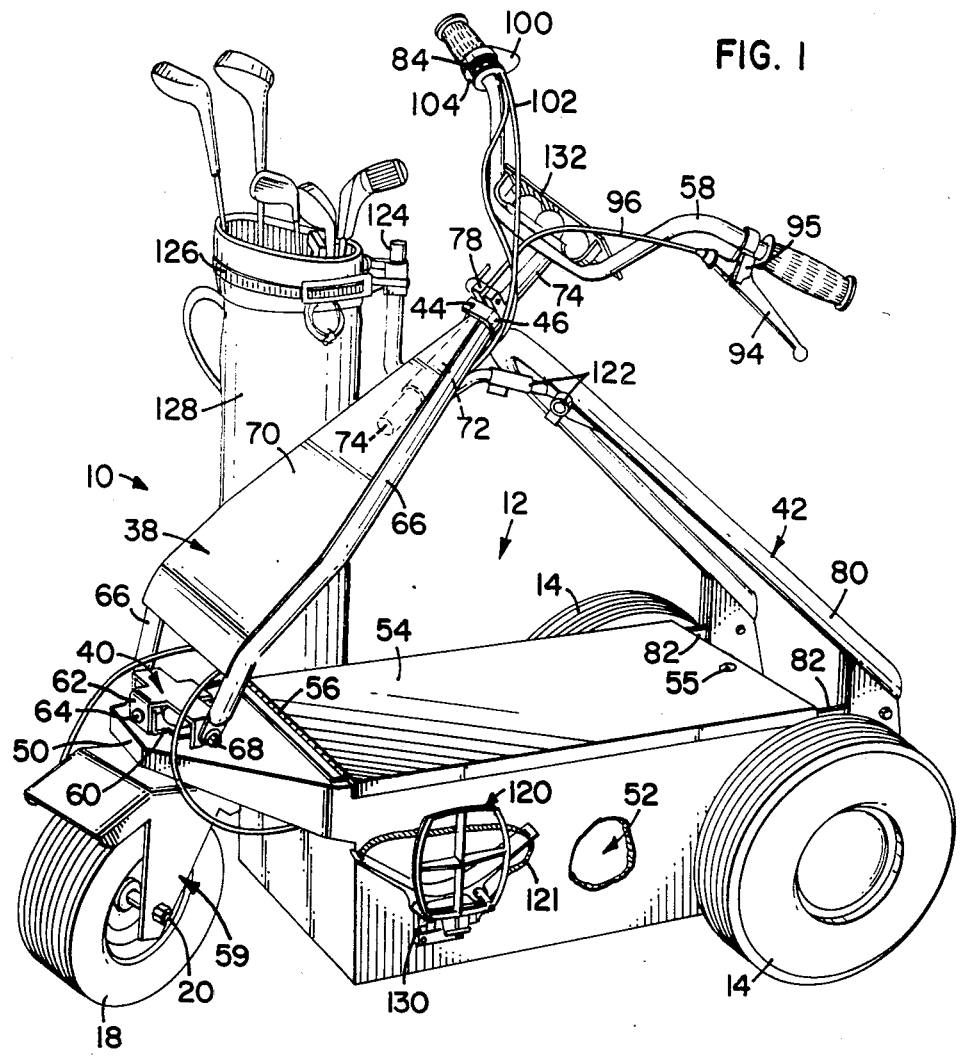
FIG. 1 is a view in perspective of a preferred embodiment of the present invention illustrated carrying a golf bag.
Figure 4:
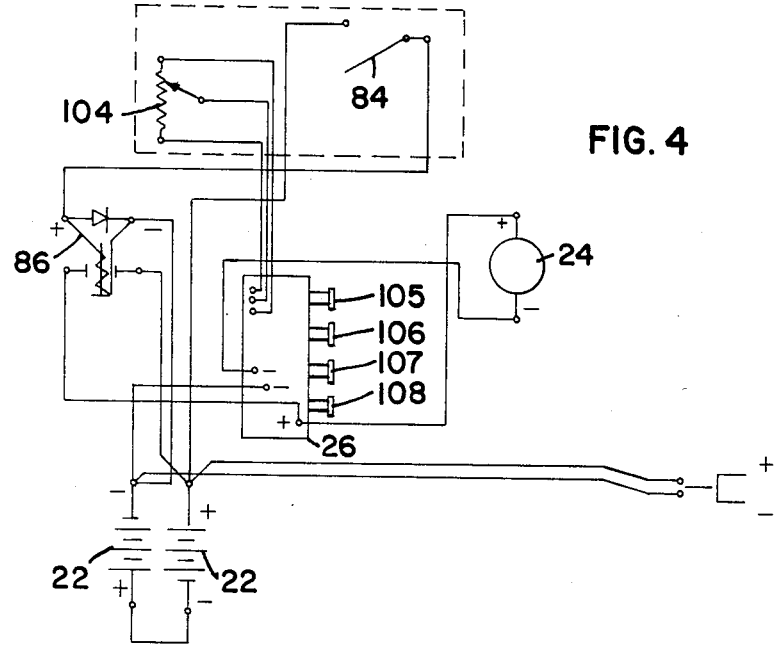
FIG. 4 is an electrical schematic of the motor control circuitry of the present invention.
Figure 5:
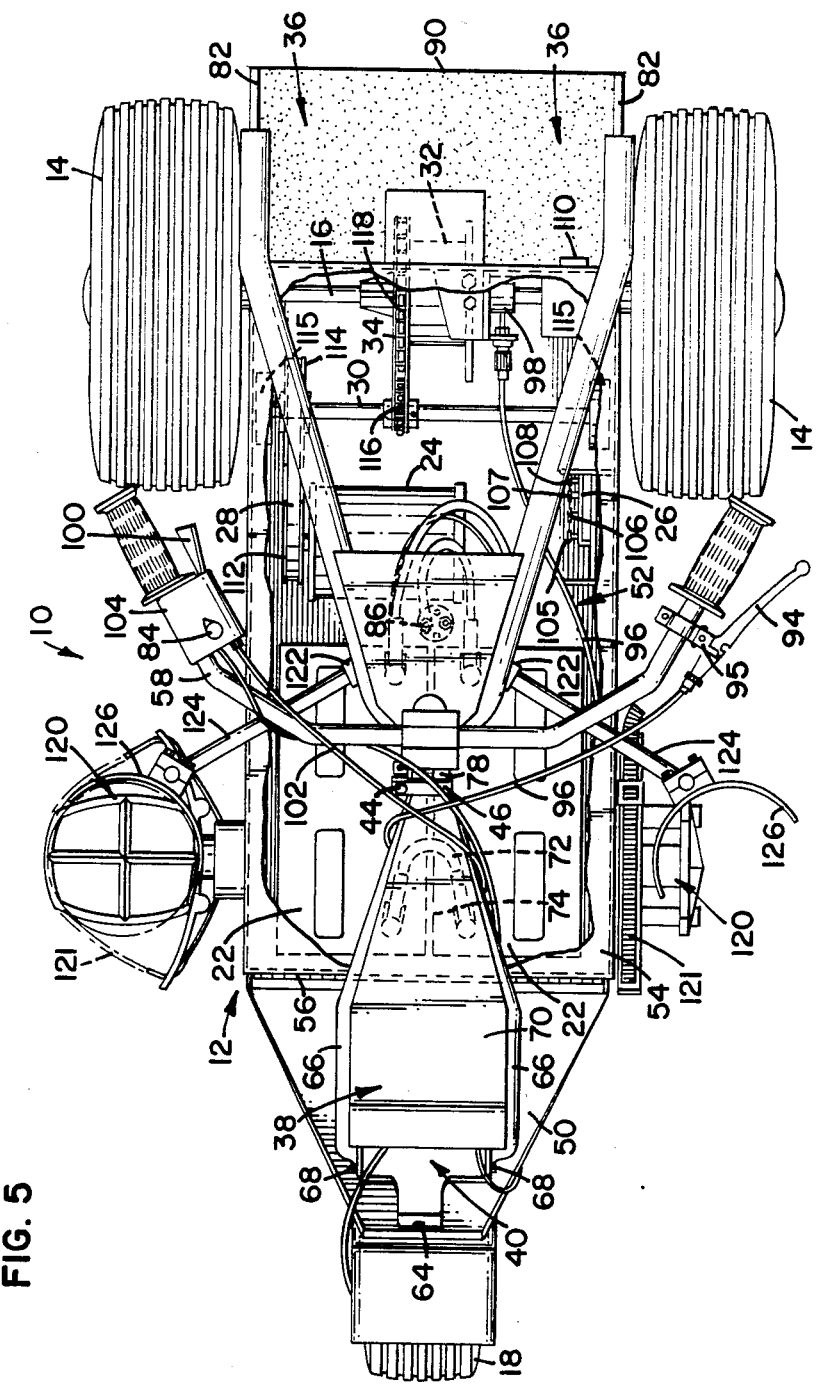
FIG. 5 is a top plan view of the embodiment shown in FIG. 1 with portions cut away to disclose the electrical and drive mechanism on the inside of the frame.

Illustrated in FIG. 1 is a preferred embodiment of the present invention generally designated by the reference numeral 10. As illustrated the embodiment generally includes a main frame or platform 12 supported above the surface of the ground by three wheels two of which are rear wheels 14 interconnected by an axle 16 as generally illustrated in FIG. 5 and one of which is a front wheel 18 suitably mounted on an axle 20. As illustrated in FIG. 5, the power source of the preferred embodiment includes two twelve volt batteries 22 interconnected in series to provide twenty-four volts. Current or amperage is varied to a variable amperage DC motor 24 by a variable speed controller 26. (FIG. 4 is an electrical schematic illustrating the interconnection between the twelve volt batteries 22, the DC motor 24 and the variable speed controller 26.) The DC motor 24 in turn is interconnected by a gear belt 28 to a jack shaft 30 which in turn is interconnected to a differential mechanism 32 of the rear axle 16 by a roller chain 34.

The frame 12 of the golf car defines two foot support areas 36 on each side of the differential mechanism 32, the foot support areas 36 extending under the rear axle 16 such that when a user is standing on the foot support areas 36, the user's feet extend at least partially under the rear axle 16.

Although the golf car is relatively light, when standing on the golf car with one's feet positioned in the foot support areas 36 partially under the axle 16, the golf car is very difficult to tip due to the relatively low center of gravity.

The preferred embodiment further includes a collapsible steering column 38 interconnected to the front wheel 18 of the golf car by a U-joint mechanism 40 to allow universal movement of the steering assembly column 38. The U-joint mechanism 40 is configured, as discussed later, to limit the amount the front wheel 18 may be turned to either side. Furthermore, the steering column assembly is supported in an upright position by a collapsible support structure 42 which, in the preferred embodiment, is releasably interconnected near the top of the steering column assembly 38 by a lock pin 44 removeably inserted through apertures in the ends of a U-shaped bracket 46 positioned about the upper end of the steering column assembly 38.

Figure 2:
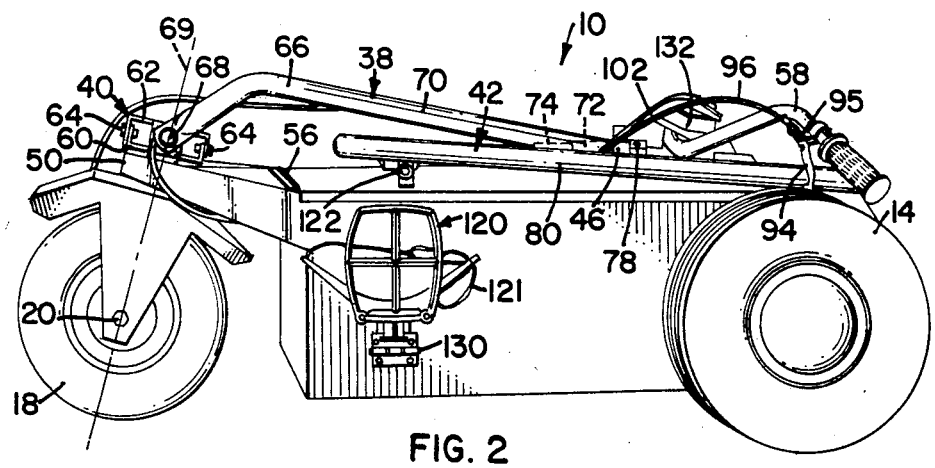
FIG. 2 is a side elevational view of the embodiment shown in FIG. 1 with the steering column assembly and its associated support framework collapsed into the transport position.

In the preferred embodiment, the golf car has an overall width of approximately twenty-eight (28) inches and a length of approximately fifty-two (52) inches. The overall height of the golf car will vary depending on whether the golf car is in an assembled ready-for-use configuration as generally illustrated in FIG. 1 or in a disassembled ready-for-transport configuration as generally illustrated in FIG. 2. In the assembled configuration, the height of the golf car is adjustable as the steering column assembly 38 includes adjustable height handlebars 58 which are telescopically mounted. The height of the golf car in the disassembled configuration is approximately twenty-one (21) inches. Accordingly, the golf car may be readily loaded into most vehicle trunks. In both configurations, the golf car has a ground clearance of approximately two (2) inches. Furthermore, the overall weight of the golf car is approximately two hundred forty (240) pounds. The rear wheels are fifteen (15) inches high and six (6) inches wide while front wheel is thirteen (13) inches high and six (6) inches wide.

The main frame or platform 12 of the golf car is generally rectangular in configuration with a tongue-like portion 50 extending beyond the front end to provide a mounting surface for the front wheel 18. The remainder of the main frame 12 defines a compartment 52 as generally illustrated in FIG. 5, wherein the top surface of the main frame 12 is broken away, for containing the batteries 22, the DC motor 24, the variable speed controller 26, and the associated drive train mechanism. The compartment 52 is enclosed by a cover 54 which is hinged by a piano type hinge 56 to the main frame 12 so as to provide ready access to the electrical and drive conponents. Preferably the frame 12 is made of an aluminum construction to minimize the weight of the golf car.

As illustrated in FIGS. 1 and 2, the steering column assembly 38 is interconnected by the U-joint mechanism 40 to the fork and spindle assembly 59 of the front wheel 18. The U-joint mechanism includes a lower and upper coupling 60, 62 pivotally interconnected by a pivot pin 64 enabling pivotal motion of the upper coupling 62 generally about a horizontal axis extending longitudinally of the golf car. Two outside, tubular frame members 66 of the steering column assembly 38 are pivotally interconnected at 68 to the upper coupling 62 for pivotal movement about a generally horizontal axis extending transversely of the golf car. Accordingly, the steering column assembly 38 is provided with universal movement both longitudinally and transversely of the golf car.

As further illustrated in FIGS. 6 and 7, the pivot pins 68 interconnecting the steering column 38 to the upper coupling 62 further serve to limit the axial rotational movement of the front wheel 18 by engaging the lower coupling 60 at areas 61a, b when the front wheel 18 is pivoted through a predetermined angle to either side. Preferably, the wheel 18 is limited to a forty-five (45) to sixty (60) degree range of motion to either side or a total range of motion of ninety (90) to one hundred twenty (120) degrees. This prevents the front wheel (18) from being turned too sharply such that the front wheel 18 jams or locks.

As illustrated in FIG. 2 by broken line 69, the spindle of the front wheel 18 is angled such that its longitudinal axis is oblique with respect to the vertical. Preferably this angle is approximately fifteen (15) degrees. Accordingly, when the wheel 18 is turned sideways it will be tilted such that the leading side edge does not engage the surface of the ground. This reduces the likelihood that the leading edge of the front wheel 18 will grab the ground when turned.

The tubular frame members 66 of the steering column assembly 38 are interconnected by a piece of sheet metal 70 and generally converge near the top of the steering column to form a single tubular member 72 adapted for receipt of a tubular, support shaft 74 extending downward from the handlebars 58. A locking collar 78 positioned about shaft 74 enables telescopic adjustment of the handlebars 58.

The collapsible support structure 42 generally includes an elongated U-shaped tubular member 80 having the U-shaped bracket 46 positioned near the curved portion thereof. The U-shaped bracket 46 is mounted sideways such that the lock pin 44 may be inserted as to extend generally vertically when retaining the tubular member 72 of the steering column assembly 38 in place. The ends of the U-shaped tubular member 80 are in turn pivotally interconnected to two projecting members 82 near the back of the frame 12 for motion about a generally horizontal axis extending transversely of the golf car. Accordingly, by removing the lock pin 44, the support structure 42 and the steering column assembly 38 may be both provided downward on to the upper surface of the frame 12 as generally illustrated in FIG. 2.

Furthermore, in order to enable access to the power and drive mechanism, both the support structure 42 and the steering column assembly 38 are pivoted outward and left freestanding in this position. The cover 54 may then be opened, preferably the cover will include a lock 55, to gain access to the compartment 52 where the power and drive mechanisms are located. Not only does this configuration provide ease of access for servicing but also it provides an added safety feature since the throttle and other controls are removed from the work area such that the golf car cannot be accidentally started or throttled while servicing it.

Figure 3:
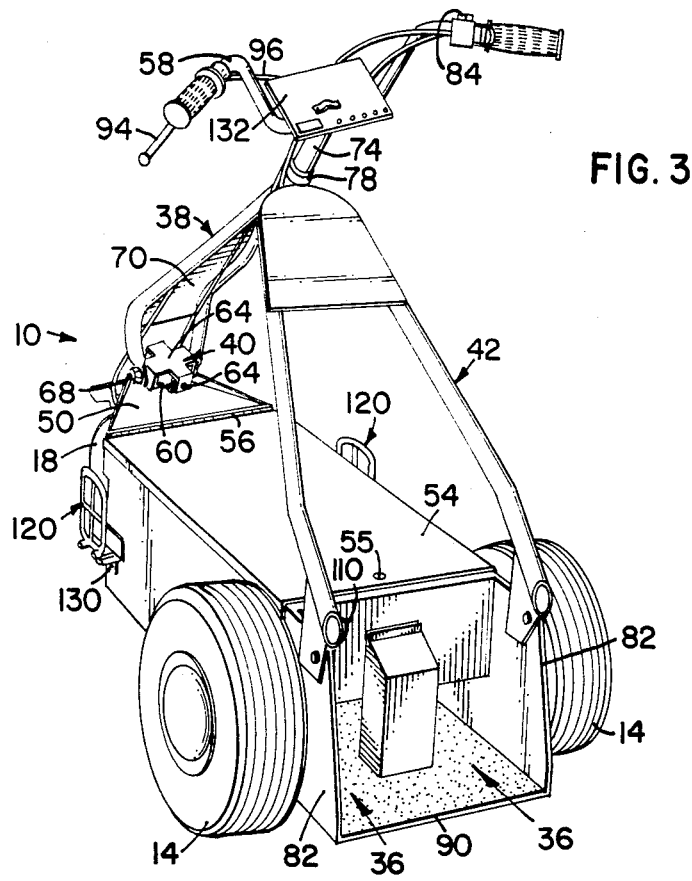
FIG. 3 is a perspective view from the back end of the preferred embodiment shown in FIG. 1.

As illustrated in FIG. 3, the back end of the frame 12 includes a generally horizontal platform 90 and the two vertically projecting side members 82. The platform 90 extends generally outward from the bottom of the frame 12 so as to be relatively close to the ground. Furthermore, the platform 90 extends generally under the rear axle 16 on both sides of the differential mechanism 32 to form the foot support areas 36. Preferably the platform 90 is covered with a non-skid material such as a rubber pad. Accordingly, when the user is operating the golf car, the user will stand on the platform 90 with his/her feet positioned in the foot support areas 36 extending generally under the rear axle 16. Thus, the golf car is provided with a relatively low center of gravity making it very difficult to tip over. Furthermore, a center of gravity is such that the front end of the vehicle will not tip up when accelerated or going up a rise. Additionally, the platform 90 is only a few inches off the surface of the ground, preferably approximately two (2) inches such that the platform 90 will engage the surface of the ground if the golf car should start to tip over backwards, thereby preventing the golf car from tipping over.

Positioned on one of the handlebars is a switch 84 activated by a key for switching the golf car on and off by activating and deactivating a solenoid 86. The other of the handlebars includes a brake control arm 94 which is interconnected by a brake cable 96 to a brake caliper assembly 98 at the rear axle 16. A manually activated clip or stop 95 cooperates with the brake control arm 94 to enable the brake to be locked in an on position when parked. Proximate the switch 84 is a throttle 100 and potentiometer assembly 104 which are interconnected by a cable 102 to the variable speed controller 26 which controls the amperage input to the DC motor 24, providing only as much current to the DC motor 24 as is necessary to place the golf car in motion and voltage as is necessary to maintain the throttle speed.

The variable speed controller 26 includes four control dials 105, 106, 107, 108 illustrated in FIG. 5, which are factory adjusted but which may be manually adjusted by the user to vary the golf car performance. The current limit dial 105, limits the maximum current provided to the D.C. motor 24. Typically this is set at fifty-five (55) amps and in the case of the preferred embodiment, should not be increased above this value to avoid damage to the controller 26, the motor 24, and related wiring. This serves as a significant safety feature protecting the electrical system from being damaged if the golf car should become stuck or otherwise immovable and the user repeatedly attempts to get it moving.

The minimum speed dial 106 shuts the variable speed controller 26 off when the throttle is in the off position. The acceleration adjustment dial 107 controls the rate of speed increment when the throttle 100 is depressed. The maximum speed dial 108 is set to provide the golf car with maximum speed when the throttle 100 is fully depressed. Accordingly, the control dials 105, 106, 107, 108 can be adjusted within limits to provide the golf car with as much responsiveness and speed as desired. Furthermore, the variable speed controller 26 in cooperation with the potentiometer 104 provides the DC motor 24 with a variable voltage depending on the speed setting of the throttle 100. Additionally, the amperage provided to the DC motor 24 is only that necessary to place the golf car in motion. In the preferred embodiment, two 105 amp, 12 volt batteries are utilized with a 24 volt motor and a 24 volt solenoid.

As illustrated in FIGS. 4 & 5 the golf car includes a receptacle 110 which enables the car to be plugged into a 110 volt outlet for charging the batteries 22. Preferably, the receptacle 110 is located at the rear of the golf car where a person's left foot is placed and preferably the receptacle 110 is configured such that the golf car cannot be hooked up improperly for charging.

The drive shaft of the DC motor 24 includes a gear belt pulley 112 which is interconnected to a gear belt pulley 114 on the jack shaft 30 by the gear belt 28. The motor 24 is adjustably mounted to enable adjustment of the tension in the gear belt 28. In a preferred embodiment, pulley 112 is a twelve tooth pulley and the pulley 114 is a thirty-six tooth pulley providing a three to one ratio.

A sprocket 116 positioned proximate the middle of the jack shaft 30 is interconnected to a sprocket 118 of the differential mechanism 32, positioned proximate the middle of the axle 16, by the roller chain 34. The jack shaft 30 is mounted on pivotally adjustable mountings 115 at the sides of the golf car to enable adjustment of the tension in the roller chain 34. In the preferred embodiment, the sprocket 116 is a ten tooth sprocket and the sprocket 118 is a sixty tooth sprocket providing a six to one ratio. It will be appreciated that the speed of the golf car can be further adjusted by changing the pulley or sprocket ratios.

The jack shaft 30 serves as gear reduction mechanism without requiring a transmission, thereby simplifying the drive mechanism of the golf car and reducing its overall weight. The variable speed controller 26 and the jack shaft 30 totally eliminate the need for a transmission.

The differential mechanism 32 on the rear axle 16 enables either or both of the rear wheels 14 to spin when not engaging the surface of the ground such that the other wheel still engaging the surface of the ground is disengaged and made stationary. This is a significant safety feature, since if the golf car should start to tip, the free wheel will be made to spin and the other wheel will be made stationary thereby reducing the likelihood of tipping completely over.

Accordingly, the DC motor 24 and its associated control circuitry in cooperation with the drive mechanism provides for relatively low and uniform acceleration and deceleration. Furthermore, the life time of the batteries 22 is greatly extended since they are utilized at a variable voltage as compared to other systems where a constant voltage is utilized. The variable speed controller 26 utilized may be any one of several commonly available controllers. (One company supplying such controllers is Dart Controls, Inc. located in Zionsville, Ind.)

Mounted on the sides of the main frame 12 are golf bag holding assemblies 120 for supporting a golf bag 128 and their associated flexible clamp and strap assembly 121 for fastening about the circumference of the bag near the bottom thereof. Removably mounted in a tubular member 122 on the support structure 42 is an L-shaped arm 124 which includes a similar flexible clamp and strap assembly 126 for fastening about the circumference of the golf bag 128 near the top thereof. The holding bracket assemblies 120 are pivotally mounted at 130 for pivoting about a generally horizontal axis and are spring loaded so as to pivot into a vertical or stored position when not in use as generally illustrated in FIGS. 1 and 2. Accordingly the holding bracket assemblies 120 may be utilized for lifting the golf car into the trunk of a vehicle or the like.

As illustrated in FIG. 3, positioned on the handlebars 58 might be a convenience panel 132 for holding golf balls, tees, score cards, etc.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A golf car apparatus, comprising:
    (a) a frame supported off the surface of the ground by at least three wheels, two of said wheels being positioned near the back end of the frame and being interconnected by an axle;
    (b) a DC battery power source interconnected to an electrical motor, said DC battery power source and said electrical motor being supported by said frame;

(c) a drive mechanism interconnected to said electrical motor, said drive mechanism including a differential mechanism positioned near the center of said axle interconnecting said two back wheels;

(d) foot support means defined by said frame on either side of said differential mechanism and extending under said axle for positioning of said user's feet, said user's feet extending at least partially under said axle and positioned in said foot support means;

(e) a collapsible steering column assembly including handlebars interconnected to a front wheel by universal joint means, said universal joint means including movement limiting means limiting the angle the front wheels can be turned to the left or right; and (f) a collapsible support structure for supporting said steering column in an upright position, said support structure being releasably interconnected to said steering column assembly to enable said steering column assembly and said support structure to be collapsed on to said frame.

2. A golf car apparatus in accordance with claim 1, wherein said golf car apparatus includes a variable speed controller means interconnected to said DC motor for providing a variable amperage input into said DC motor.

3. A golf car apparatus in accordance with claim 2, wherein said drive mechanism includes a jack shaft providing a gear reduction feature.

4. A golf car apparatus in accordance with claim 3, wherein said DC motor is interconnected to said jack shaft by a pulley and gear belt assembly, said jack shaft being interconnected to said rear axle by a chain and sprocket assembly.

5. A golf car apparatus in accordance with claim 4, wherein the ratio between a first pulley and said motor and a second pulley on said jack shaft is 3 to 1 and wherein the ratio between a first sprocket on said jack shaft and a second sprocket on said rear axle is 6 to 1.

6. A golf car apparatus in accordance with claim 1, wherein said collapsible support structure is interconnected to said collapsible steering column assembly by a U-shaped bracket and removable locking pin, said collapsible support structure and said collapsible steering column assembly both being pivotal about horizontal axes.

7. A golf car apparatus in accordance with claim 1, wherein said frame defines a covered compartment containing said DC battery power source and said electric motor, said compartment being covered by a hinged cover providing for ready access to said DC battery power source and said electric motor.

8. A golf car apparatus in accordance with claim 1, wherein said U-joint means includes an upper coupling member and a lower coupling member pivotally connected to one another for pivotal motion about a generally horizontal axis extending longitudinally of said golf car apparatus.

9. A golf car apparatus in accordance with claim 8, wherein said steering column assembly is pivotally connected to said upper coupling for pivotal motion about a generally horizontal axis extending transversely of said golf car.

10. A golf car apparatus in accordance with claim 9, wherein said upper and lower couplings cooperate to limit the amount the front wheel may be turned to the right and left.

11. A golf car apparatus, comprising:
(a) a frame supported off the surface of the ground by a plurality of wheels;
(b) a drive means for moving said golf car apparatus;
(c) a steering column including handlebars interconnected at a bottom end to a front one of said wheels by a U-joint means; and
(d) a support framework releasably interconnected at an upper end to said steering column intermediate of said bottom end and said handlebars and interconnected to said frame at a lower end adjacent the rear of said golf car for supporting said steering column, said support framework and said steering column each being interconnected at their respective lower ends to said frame for pivotal motion about generally horizontal axes, whereby upon being released from each other said steering column assembly and said support framework may both be pivoted down onto said frame to provide for transport of said golf car in a trunk or a vehicle or the like.

12. A self-propelled vehicle comprising:
(a) a frame supported off the surface of the ground by at least three wheels, two of said wheels being disposed near a rear end of the frame and being interconnected by a rear axle, and the third wheel being a front, steering wheel positioned at the front end of the vehicle;
(b) a steering handle column assembly connected at its bottom end to the front wheel by universal joint means and including handlebars;
(c) drive means having a power source and a power transmission mechanism for driving said vehicle, said power transmission mechanism being coupled to said rear axle interconnecting said two rear wheels; and
(d) foot support means for positioning a user's feet defined by said frame under said rear axle and extending rearwardly thereof.

13. The self-propelled vehicle of claim 12 wherein the user's feet extend at least partially under said axle and are positioned on said foot support means.

14. The self-propelled vehicle of claim 12, wherein said power transmission mechanism includes a jack shaft providing a reduction mechanism feature.

15. The self-propelled vehicle of claim 12, wherein said power transmission mechanism includes differential means positioned on said rear axle interconnecting said two rear wheels and permitting either or both of the rear wheels to spin when not engaging the surface of the ground.

16. The self-propelled vehicle of claim 12, wherein at least one holding bracket assembly for holding a golf bag or the like is pivotally mounted to one side of said frame, said bracket assembly being pivotally swingable between a substantially horizontally extending position of use and a substantially vertical stored position.

17. The self-propelled vehicle of claim 16 wherein said holding bracket assembly is spring loaded so as to be urged into said stored position when not in use.

18. The self-propelled vehicle of claim 12, wherein said universal joint means includes limiting means for limiting the range of axial pivotal movement of the front wheel.

19. The self-propelled vehicle of claim 18, wherein said universal joint means includes an upper coupling member and a lower coupling member pivotally connected to each other for pivotal motion about a generally horizontal axis extending longitudinally of said vehicle.

20. The self-propelled vehicle of claim 19, wherein said steering handle column assembly is pivotally connected to said upper coupling member for pivotal motion about a generally horizontal axis.

21. A self-propelled vehicle comprising:
 (a) a frame supported off the surface of the ground by at least three wheels, two of said wheels being disposed near the rear end of the frame and being interconnected by a rear axle, and the third wheel being a front wheel positioned at the front end of the vehicle;
 (b) a steering handle column assembly connected at its bottom end to said front wheel and including handle bars at its upper end;
 (c) drive means having a power source and a power transmission mechanism for driving said vehicle, said power transmission mechanism being coupled to said rear axle to supply driving power to said rear wheels; and
 (d) a foot support platform for the user defined by said frame and extending under said rear axle and rearwardly thereof, whereby said user may conveniently step onto said foot support platform at the rear of the vehicle with his feet extending at least partially under said rear axle to thus position the user's weight substantially in vertical alignment with the rear axle at a location thereunder and provide a center of gravity which makes it very difficult for the vehicle to tip rearwardly.

22. A self-propelled vehicle comprising:
 (a) a frame structure supported off the surface of the ground by at least three wheels, two of said wheels being disposed near a rear end of the frame and being interconnected by a rear axle, and the third wheel being at the front end of the vehicle;
 (b) a steering handle column assembly connected at a bottom end thereof to said front wheel for steering movement thereof and including handlebars, said steering column assembly being connected at said bottom end thereof to said front wheel through pivot joint means on said frame structure for pivotal movement about a horizontal axis;
 (c) drive means comprising a power source and a power transmission mechanism connected to said rear axle for driving said vehicle;
 (d) foot support means on said frame adjacent the rear end thereof for supporting a driver in a standing position; and
 (e) an elongated support column member releasably connected at its upper end to said steering column assembly intermediate said bottom end thereof and said handlebars for supporting said steering column assembly in a generally upright position of use, said support column member being pivotally connected at its lower end to said frame adjacent the rear end thereof for pivotal movement about a horizontal axis, whereby upon being released from each other said support column member and said steering column assembly may both be pivotally collapsed downwardly onto said frame structure into a compact storage condition.

23. The self-propelled vehicle of claim 22, wherein said pivotal connection for said support column member is located above and rearwardly of said rear axle.

24. The self-propelled vehicle of claim 22, wherein said pivot joint means connecting said steering column assembly to said front wheel is a universal joint, and said front wheel is mounted on an axle in a wheel fork connected at its upper end to said universal joint for lateral turning movement by said steering column assembly.

* * * * *